(12) United States Patent
Crawford

(10) Patent No.: US 9,102,280 B1
(45) Date of Patent: Aug. 11, 2015

(54) BICYCLE TRANSPORTING SYSTEMS

(76) Inventor: John Crawford, Scottsdale, AZ (US)

( * ) Notice: Subject to any disclaimer, the term of this patent is extended or adjusted under 35 U.S.C. 154(b) by 517 days.

(21) Appl. No.: 12/637,747

(22) Filed: Dec. 15, 2009

Related U.S. Application Data

(60) Provisional application No. 61/122,697, filed on Dec. 15, 2008.

(51) Int. Cl.
*B60R 9/10* (2006.01)

(52) U.S. Cl.
CPC ........................................ *B60R 9/10* (2013.01)

(58) Field of Classification Search
USPC ......... 224/501, 504, 506, 519, 531, 532, 534, 224/535, 536, 537, 924; D12/407, 408; 211/19, 20
See application file for complete search history.

(56) References Cited

U.S. PATENT DOCUMENTS

| | | | | |
|---|---|---|---|---|
| 605,628 | A * | 6/1898 | Bradley | 211/5 |
| 3,917,138 | A * | 11/1975 | Bergeron | 224/535 |
| 4,298,151 | A * | 11/1981 | O'Connor | 224/329 |
| D294,564 | S * | 3/1988 | Stoecker | D12/408 |
| 4,856,686 | A * | 8/1989 | Workentine | 224/497 |
| D341,348 | S * | 11/1993 | Williams | D12/408 |
| 5,476,202 | A * | 12/1995 | Lipp | 224/532 |
| 5,476,203 | A * | 12/1995 | Fletcher | 224/536 |
| 5,489,110 | A * | 2/1996 | Van Dusen | 280/415.1 |
| 5,509,776 | A * | 4/1996 | Specht et al. | 414/462 |
| 5,526,971 | A * | 6/1996 | Despain | 224/519 |
| 5,560,526 | A * | 10/1996 | Jantzen et al. | 224/571 |
| 5,647,521 | A * | 7/1997 | Burgess | 224/534 |
| 5,695,103 | A * | 12/1997 | Duvernay et al. | 224/532 |
| 5,833,074 | A * | 11/1998 | Phillips | 211/21 |
| 5,871,131 | A * | 2/1999 | Low et al. | 224/537 |
| 6,015,127 | A * | 1/2000 | Carr | 248/339 |
| 6,019,266 | A * | 2/2000 | Johnson | 224/534 |
| 6,045,022 | A * | 4/2000 | Giles | 224/532 |
| 6,047,869 | A * | 4/2000 | Chiu | 224/314 |
| 6,244,483 | B1 * | 6/2001 | McLemore et al. | 224/521 |
| 6,491,195 | B1 * | 12/2002 | McLemore et al. | 224/537 |
| 6,511,088 | B2 * | 1/2003 | Kahlstorf | 280/415.1 |
| 6,695,185 | B2 * | 2/2004 | Church | 224/521 |
| 6,736,301 | B1 * | 5/2004 | Huang | 224/500 |
| 6,752,303 | B2 * | 6/2004 | McLemore et al. | 224/521 |
| 6,854,630 | B2 * | 2/2005 | Anderson et al. | 224/536 |
| 6,857,545 | B2 * | 2/2005 | McLemore et al. | 224/519 |

(Continued)

FOREIGN PATENT DOCUMENTS

| | | | |
|---|---|---|---|
| EP | 95548 A2 * | 12/1983 | |
| GB | 2363772 A * | 1/2002 | |

*Primary Examiner* — Justin Larson
(74) *Attorney, Agent, or Firm* — Andrew P. Lahser

(57) ABSTRACT

These systems allow transporting a bicycle on a vehicle. The bicycle may have two wheels, a front wheel and a rear wheel, each wheel having spokes or other passage between the wheel's tire and the wheel's axle, and a hinge to allow steering between the front wheel and the rear wheel. The system includes a front and rear wheel-suspender to suspend the front and rear wheel by passing through the spokes to allow the front wheel to hang on the front wheel-suspender. The system includes a support to support the front wheel-suspender and the rear wheel-suspender separated by a span sufficient to allow suspension of the bicycle while the front wheel and rear wheel remain operably attached to the bicycle. The system includes a mount to mount the support to the vehicle. Also disclosed is a system for hitching together frames to expand the number of bicycles that may be transported by the system.

23 Claims, 14 Drawing Sheets

(56) References Cited

U.S. PATENT DOCUMENTS

| | | | |
|---|---|---|---|
| 7,117,700 B2 * | 10/2006 | Smith et al. | 70/225 |
| 7,240,816 B2 * | 7/2007 | Tsai | 224/501 |
| 7,614,637 B1 * | 11/2009 | Kidd | 280/480 |
| 7,922,051 B2 * | 4/2011 | Devine | 224/519 |
| 7,959,047 B2 * | 6/2011 | Hammond | 224/521 |
| 8,276,932 B2 * | 10/2012 | Columbia | 280/511 |
| 2002/0096546 A1 * | 7/2002 | Bogoslofski | 224/497 |
| 2008/0164292 A1 * | 7/2008 | Farney | 224/324 |

\* cited by examiner

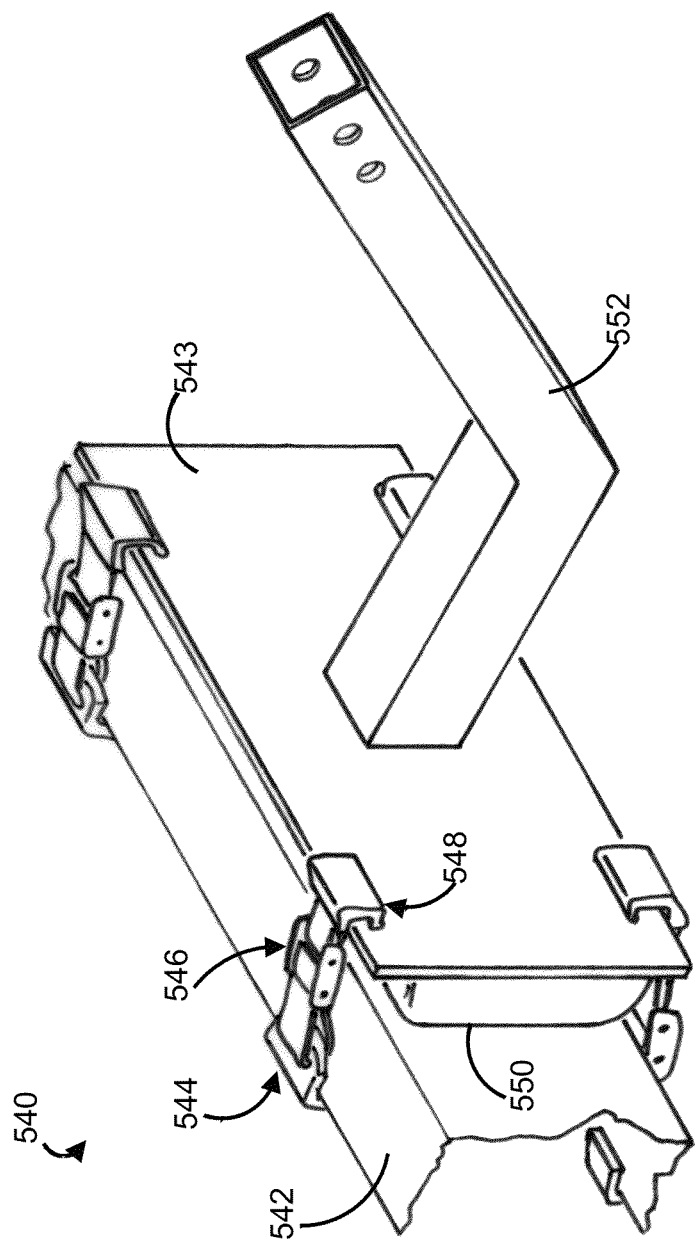

BICYCLE TRANSPORTING SYSTEMS

CROSS REFERENCE TO RELATED APPLICATION

The present application is related to prior provisional application Ser. No. 61/122,697, filed Dec. 15, 2008, the contents of which are incorporated herein by this reference and are not admitted to be prior art with respect to the present invention by the mention in this cross-reference section.

BRIEF DESCRIPTION OF THE DRAWINGS

FIG. 7 shows a perspective view illustrating a mounting member for mounting a rack to a vehicle bumper.

DETAILED DESCRIPTION

The present Bicycle Transporting Systems will now be discussed in detail with regard to the attached drawing figures, which were briefly described above. In the following description, numerous specific details are set forth illustrating the Applicant's best mode for practicing the Bicycle Transporting Systems and enabling one of ordinary skill in the art to make and use the Bicycle Transporting Systems. It will be obvious, however, to one skilled in the art that the present Bicycle Transporting Systems may be practiced without many of these specific details. In other instances, well-known manufacturing methods, mechanical engineering considerations, and other details have not been described in particular detail in order to avoid unnecessarily obscuring this disclosure.

Figure 1:
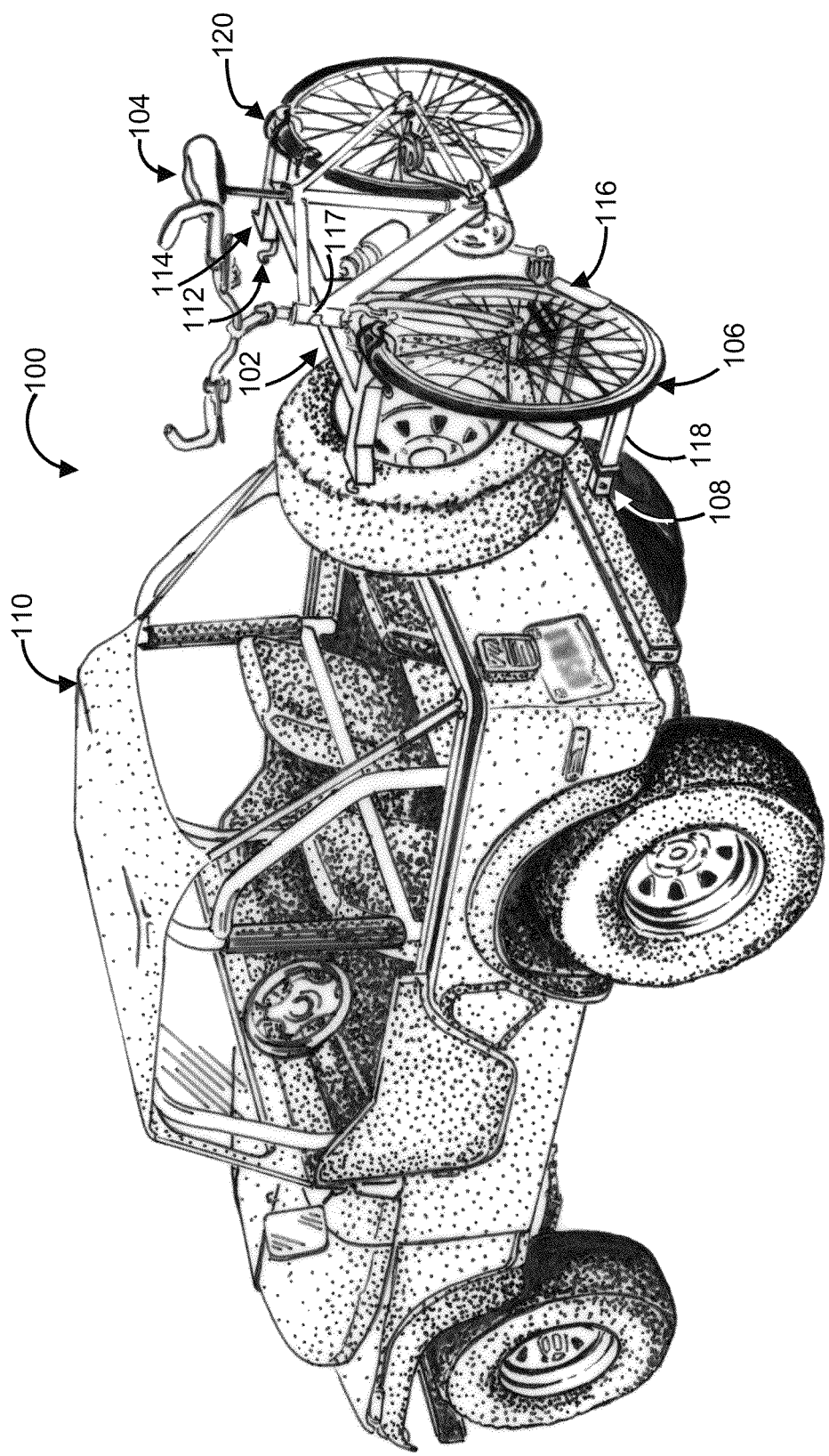
FIG. 1 shows a perspective view illustrating a bicycle transporting system that mounts to a vehicle receiving hitch and carries up to two bikes by suspending and bracing the wheels.

FIG. 1 shows a perspective view illustrating bicycle transporting system 100 that includes a T-shaped rack 102 to transport bicycle 104 by hanging and bracing bicycle 104 by wheels 106 while rack 102 may be mounted to receiver hitch 108 of vehicle 110. Rack 102 holds wheels 106 of bicycle 104 by passing hooks 112 through wheels 106 and allowing wheels 106 to rest and suspend from hooks 112, as shown. Rack 102 braces wheels 106 by holding wheels 106 along braces 114, as shown. Braces 114 extend alongside the portions of wheels 106 while wheels 106 are suspended by hooks 112, as shown. Braces 114 minimize rotation of stem and headset 117. Said another way, braces 114 hold the front wheel and rear wheel of bicycle 104 in relatively similar planes thereby preventing shifting of the load of bicycle 104, such as, for example, shifting caused by transporting. This embodiment is shown with positions for two bicycles, the first bicycle is drawn in FIG. 1, a second bicycle could be positioned on the hooks between vehicle 110 and bicycle 104.

Rack 102 has groove 116 to hold wheels 106, as shown. Groove 116 holds wheels 106 to prevent rotation around the axis formed by the suspension of the front wheel on the front hook and the rear wheel on the rear hook. Groove 116 limits swaying of the bicycle around this axis. Together, hooks 112, braces 114, and groove 116 allow placement of bicycle 104 onto rack 102 with a single lift and placement of bicycle on rack 102, as shown. After lifting and placing, bicycle 102 may be unlikely to shift during transport. Further, wheels 106 may be secured with strap 120, as shown, which may prevent wheels 106 from becoming dislodged from hooks 112 during transport by vehicle 110.

Rack 102 removeably attaches to vehicle 110. Rack 102 includes a mount 118 that couples with receiving hitch 108, as shown. Mount 118 may be formed to mate with receiving hitch 108, for example, mount 118 may include an aperture that permits a bolt to extend from one side of the receiving hitch 108, through mount 118, and out the other side of receiving hitch 108, where the bolt may be held in place by a cotter pin or other fastener. Receiving hitch 108 may support a maximum tongue weight of maximum force that may be exerted on receiving hitch 108. Rack 102 may be designed considering the average maximum tongue weight or the tongue weight for a particular vehicle or a particular class of vehicles, for example, materials selected for use in rack 102 may be selected to minimize the weight exerted on receiving hitch 108 while providing sufficient stiffness while fully loaded with various size bicycles.

Rack 102 may be a single, integral frame, for example, rack 102 may be built from commercially available square steel tubing, cut to fit the design, and then permanently welded together. In another embodiment, the rack may include a single, integral frame (including the mount, the t-shaped frame, the braces, the sway-limiting groove, and/or other desirable portions) which may be manufactured as a single piece (for example by extrusion, molding or other techniques). In further embodiments, the rack may include a hinge, joint, or other means to allow folding or separation of the rack along two or more portions to allow for storage. These racks provide for transporting bicycles on a vehicle, when the bicycle has a front and rear wheel attached to a bicycle frame, when the wheels have spokes (or other passage between the tire and the axle) and a headset (or other hinge to allow steering between the wheels). These racks have hooks or other suspenders to suspend the front wheel and the rear wheel by passing through the wheel (between the tire and the axle) so that the wheel suspends from the hook or suspenders while the wheels are attached to the bicycle frame in an operable position. The hooks or suspenders may be attached to a support separated by a span sufficient to allow suspension of the bicycle while the front wheel or rear wheel remain operably attached to the bicycle. The support may be attached to a mount to mount the support to a vehicle. System 100 may further include a sway limiter to limit the sway of the bicycle around the axis formed between the front and rear wheel hooks. Other embodiments disclosed herein may show other types and configurations of hooks, suspenders, fasteners, mounts and other parts of the system.

Figure 2:
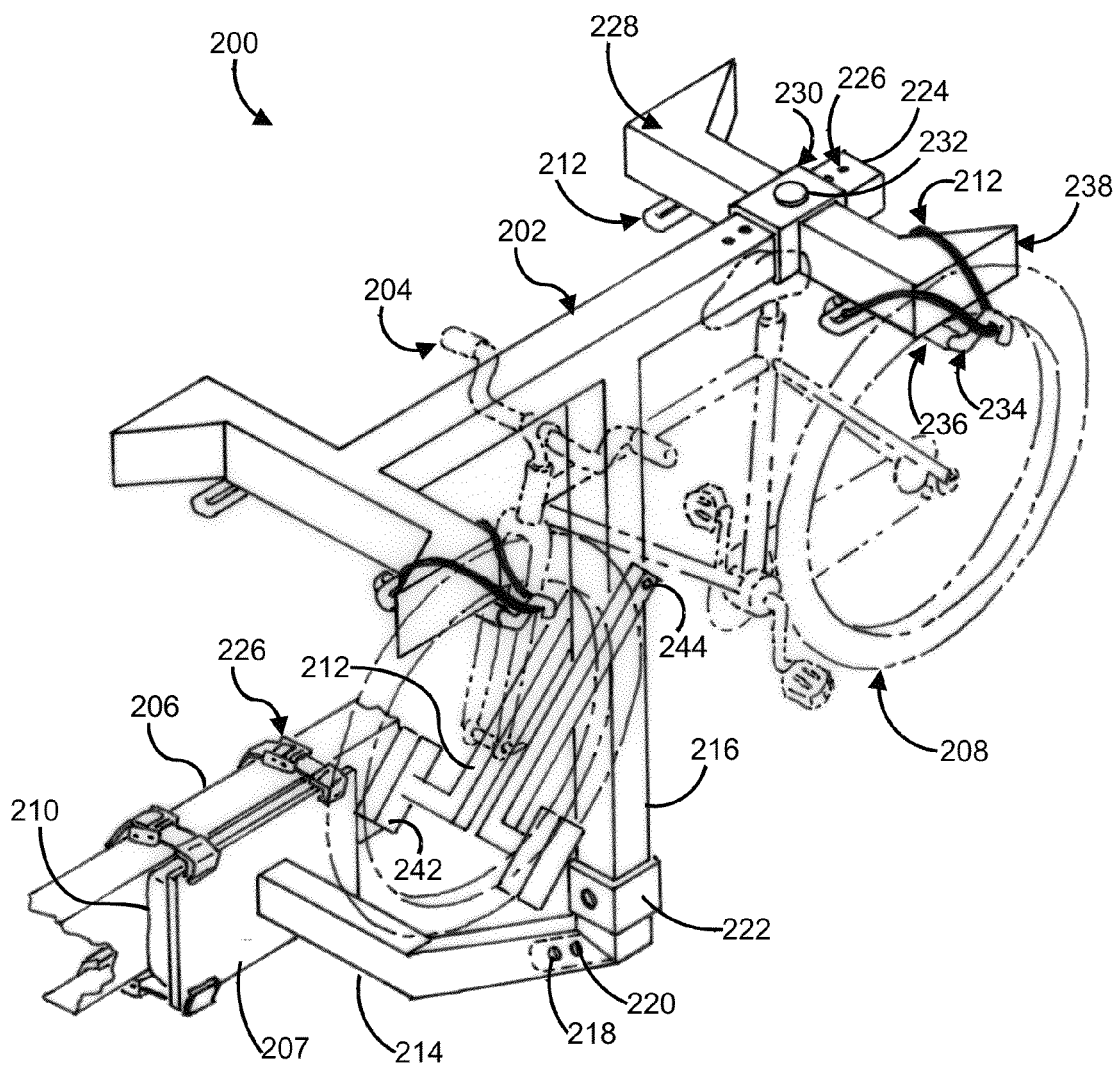
FIG. 2 shows a perspective view illustrating a bicycle transporting system that mounts to a vehicle bumper, carries up to two bicycles by suspending and bracing the wheels, adjusts to the wheel span and wheel size, disassembles for storage, and allows additional frame portions to bolt on to carry additional bikes.

FIG. 2 shows a perspective view illustrating bicycle transporting system 200 including rack 202 to transport bicycle 206 by hanging and bracing bicycle 204 by wheels 208 and mounting to bumper 206 of the vehicle (without a receiver hitch), where rack 202 may be folded while not in use and adjusted for bicycles of differing wheel spans and different size wheels. In this embodiment, rack 202 may connect to the vehicle by attachment to bumper 206, as shown. Rack 202 may terminate in a bumper-mating plate 207, which may be designed to conform or mate to the shape or profile of the bumper, such as, for example, an L-shaped plate to cover the top and face of the bumper. Bumper-mating plate 207 may extend along the length of bumper 206, along either side of rack 202, as shown. Bumper-mating plate 207 may extend along bumper 206 far enough to support rack 202 when rack 202 may be holding the maximum number of bicycles. Bumper-mating plate 207 may be lined with liner 210, such as, for example a rubber coating, a foam cushion, or other material that may prevent damaging bumper 206 or the paint on bumper 206. Bumper-mating plate 207 may be removeably attached to bumper 206 using two or more straps 212, as shown. Alternately, fasteners other than straps may be used, such as, for example, hooks, screws, or clips, hook and loop fasteners, etc., Bottom frame 214 and upright frame 216 may be hingedly connected, as shown. Bottom frame 214 may include hinge 218, as shown, which allows hinge 218 to rotate to allow bottom frame 214 to fold toward upright frame 216. When hinge 218 is in the fully open position, bolt 220 may be placed through a set of apertures in bottom frame 214 and a set of apertures in upright frame 216, thereby preventing movement of hinge 218 when rack 202 is in use. This arrangement may allow for folding of rack 202 during storage, but, still allows the rack to be substantially immobile during transportation of bikes. Mount 222 may be used to add additional frames to carry additional bikes. (See FIG. 4 and FIG. 12 for discussion of hitching additional frames.)

Rack 202 may adjust for bikes of different size wheel spans or different size wheels. In this embodiment, rack 202 includes a T-shape, with one arm of the T an adjustable arm 224 that includes a series of apertures 226, as shown. Slideable member 228 includes aperture 230, which is sized to permit sliding along the adjustable arm 224, as shown. To move slideable member 228, bolt 232 may be removed from slideable member 228, which will allow slideable member 228 to slide along adjustable arm 224, as shown. After moving slideable member 228, slideable member may be aligned with the series of apertures 226, which will allow bolt 232 to be reinserted, thereby preventing any further movement of slideable member 228. Slideable member 228 may be positioned to allow hooks 234 to suspend wheels 208 from the topmost portion of each wheel, when both wheels 208 are suspended from hooks 234. Bolt 232 may be further secured by a cotter pin on the underside. This arrangement may allow adjustment for wheel span without requiring any balance, lifting or other dexterous action by the user. After adjustment, placement of bolt 234 may be performed without holding slideable member 228 in position.

Bicycle 204 may be positioned on rack 202 for transporting, as shown. Bicycle 204 may be lifted high enough so that wheels 208 may pass over hooks 234 as shown. Wheels 208 may rest on protective covering 236, as shown. Protective covering 236 may cover hooks 234 to help protect the paint, finish or other surface of wheels 208, as shown. Wheels 208 may rest along braces 238, as shown. Again (similar to the previous embodiment), braces 238 may prevent rotation of the stem and headset of bicycle 204, as shown. Bungee cord 240 may wrap from fastener mount 212, to underneath a portion of hook 234, to secure on the other side of fastener mount 212, as shown. Bungee cord 240 may assist holding wheels 208 onto hooks 234 and along braces 238, even while the vehicle is in motion.

Bicycle 204 may be prevented from swaying along the axis formed by hooks 234, as shown. Rack 202 may include sway-limiting member 242, as shown. Sway-limiting member 242 may be connected to upright member 216 by hinge 244, as shown. Hinge 242 may allow sway-limiting member 242 to adjust to the size of wheels 208 of bicycle 204, as shown. For larger wheels, hinge 244 may allow sway-limiting member 242 to move toward upright member 216 to accommodate larger wheels. For smaller wheels, hinge 244 may allow sway-limiting member to move away from upright member 216 to accommodate smaller wheels. Sway-limiting member 242 allows a portion of wheels 208 to rest in a groove at distal end of sway-limiting member. When wheels 208 are positioned within sway-limiting member 242, sway-limiting member 242 will prevent swaying of the bicycle during transportation, including when the vehicle accelerates and decelerates.

System 200 provides for transporting a bicycle on a vehicle, when the bicycle has two wheels, (a front and a rear wheel), that are operably connected to the bicycle frame separated by a headset (or other hinge) to allow steering between the wheels. The system includes a rack, such rack has hooks or other suspenders to suspend the front wheel and the rear wheel by passing through the wheel (between the tire and the axle) so that the wheel suspends from the hook or suspenders while the wheels are attached to the bicycle frame in an operable position. The hooks or suspenders may be attached to a support separated by a span sufficient to allow suspension of the bicycle while the front wheel or rear wheel remain operably attached to the bicycle. Braces maybe affixed to the support adjacent to the hooks to brace the wheels to limit the rotation of the stem and headset. The support may be attached to a mount to mount the support to a vehicle.

System 200 may further include fasteners to fasten removably the front and rear wheel to the hooks or suspenders. System 200 may further include a sway limiter to limit the sway of the bicycle around the axis formed between the front and rear wheel hooks. Other embodiments disclosed herein may show other types and configurations of hooks, suspenders, fasteners, braces, sway-limiters, mounts and other parts of the system.

Figure 3:
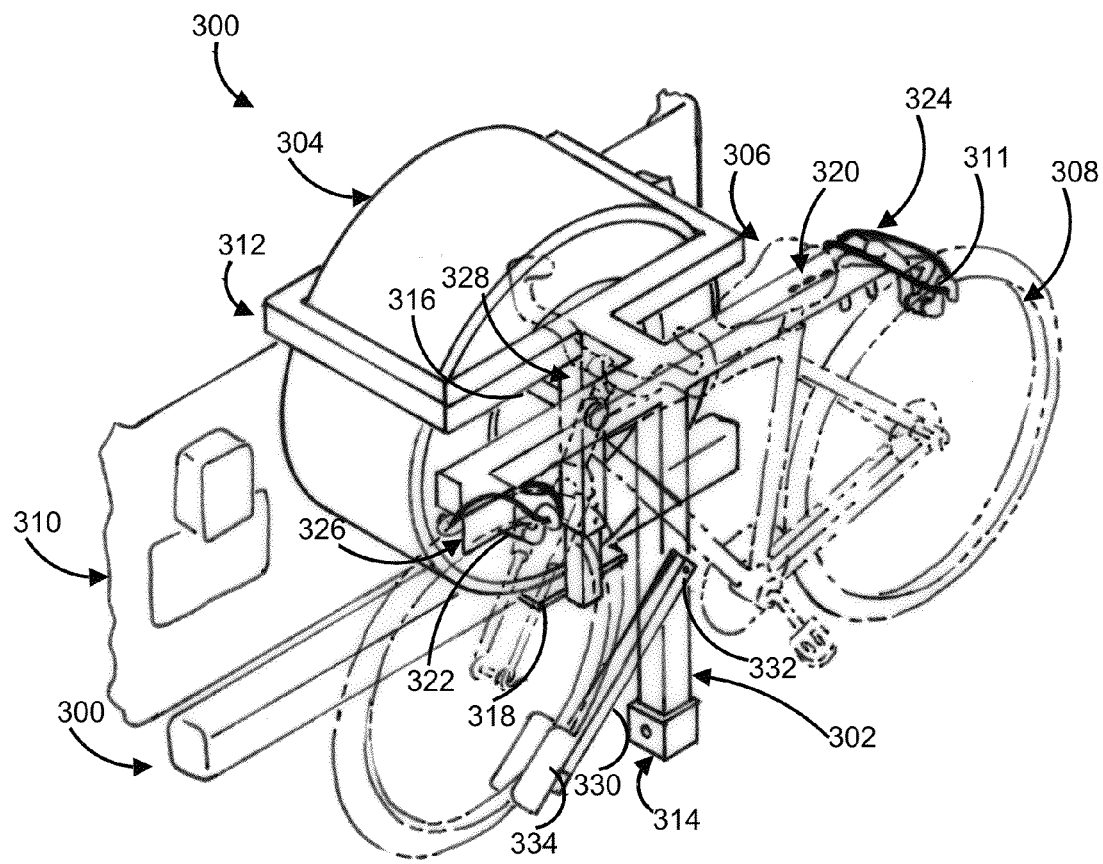
FIG. 3 shows a perspective view illustrating a bicycle transporting system that mounts to a vehicle spare tire, carries a single bicycle by suspending and bracing the wheels, adjusts to the wheel span and wheel size of the bike, and permits additional frame portions to connect to the rack to carry additional bikes.

FIG. 3 shows a perspective view illustrating a bicycle transporting system 300 that permits rack 302 to mount to sparetire 304 while bicycle 306 is suspended and braced by wheels 308, as shown. In this embodiment, rack 302 may mount to vehicle 310, as shown. (See also FIG. 6). Rack 302 provides for transporting a single bicycle. Rack 302 may be adjusted to accommodate various wheel spans and wheel sizes, as shown. (See FIG. 10A for further discussion regarding adjusting racks for various wheel spans.) Rack 302 may accommodate additional bicycles by extending the rack. Additional racks may be mounted on extension mount 314, as shown. (See FIG. 4 and FIG. 12 for additional info about extending bicycle carrying capacity for a rack.) Rack 302 provides bracing along the sides of the front wheel, but rack 302 does not provide for bracing along the side of the rear wheel. Bracing one of the two wheels may provide sufficient support to prevent rotation between the headset and stem, as shown.

Rack 302 has a T-shaped frame. Rack 302 may attach to vehicle 310 by connecting to spare-tire 304, as shown. Rack 302 includes spare-tire-mating mount 312, as shown. Sparetire-mating mount 312 may include a rectangular mount sized to fit over a portion of spare tire 304, as shown. Spare-tiremating mount 312 may include mounting-bolt 316 to attach rack 302 to this vehicle support for spare tire 304, as shown. Spare-tire-mating mount 312 may include adjustable bottom brace 318 to clamp adjustably to the bottom of spare tire 304, as shown. This configuration, and subsets, may allow removably attaching rack 302 to vehicle 310, as shown.

Hook 311 may be moved between pairs of holes 320 to change the distance between the fixed hook 322 and hook 311 to accommodate bicycles that may have larger or smaller wheels or wheel bases, as shown. Pairs of holes 320 may extend along the top portion of frame 302, as shown. Hook 311 and fixed hook 322 may pass through wheel 308 such that wheels 308 may suspend from the hook, as shown. Strap 324 may wrap around hook 311 (or fixed hook 322) to assist preventing wheels 308 from dislodging from the bike frame during transportation. Brace 326 may brace one of wheels 308 to prevent rotation of headset and stem 328, as shown. Rack 302 provides bracing along the sides of the front wheel, but rack 302 does not provide for bracing along the side of the rear wheel. Bracing one of the two wheels may provide sufficient support to prevent rotation between the headset and stem, as shown.

Sway-limiter 330 may hold the bottom portion of bicycle 306 to prevent swaying of bicycle 306 between the axis formed by hook 311 and fixed hook 322, as shown. Swaylimiter 330 may hingedly connect to frame 302 by hinge 332, as shown. Hinge 332 allows positioning of sway limiter 330 so that groove 334 may hold the bottom portion of one of wheels 308, as shown.

Rack 302 provides for transporting one or more bicycles on a vehicle, where the bicycle has two wheels, a front wheel and a rear wheel, each wheel having at least one passage between the wheel's tire and the wheel's axle, affixed to a bike frame with at least one hinge to allow steering the front wheel. Rack 302 provides a front-wheel-suspending means for suspending the front wheel by passing the front-wheel-suspending means through the passage between the front wheel's tire and the wheel's axle to allow the front wheel to hang on the frontwheel-suspending means. Rack 302 provides a rear-wheelsuspending means for suspending the rear wheel by passing the rear-wheel-suspending means through the passage between the rear wheel's tire and the wheel's axle to allow the rear wheel to hang on the rear-wheel-suspending means. Rack 302 provides a supporting means (such as a frame) for supporting the front-wheel-suspending means and the rear wheel-suspending means separated by a span sufficient to allow suspension of the bicycle while the front wheel and rear wheel remain operably attached to the bicycle. Rack 302 provides a wheel-bracing means, connected to the support, for bracing the front wheel and the rear wheel to limit the rotation of the stem and headset. Rack 302 provides a swaylimiting means, connected to the support, to limit the sway of the bicycle around the axis formed between the front wheelsuspender and the rear wheel-suspender. Rack 302 provides a mounting means for mounting the supporting means to the passenger vehicle.

Rack 302 may provide a sway-limiter, connected to the support, to limit the sway of the bicycle around the axis formed between the front wheel-suspender and the rear wheel-suspender. Rack 302 may provide a channel or groove to receive the bottom portion of a bicycle wheel.

Figure 4:
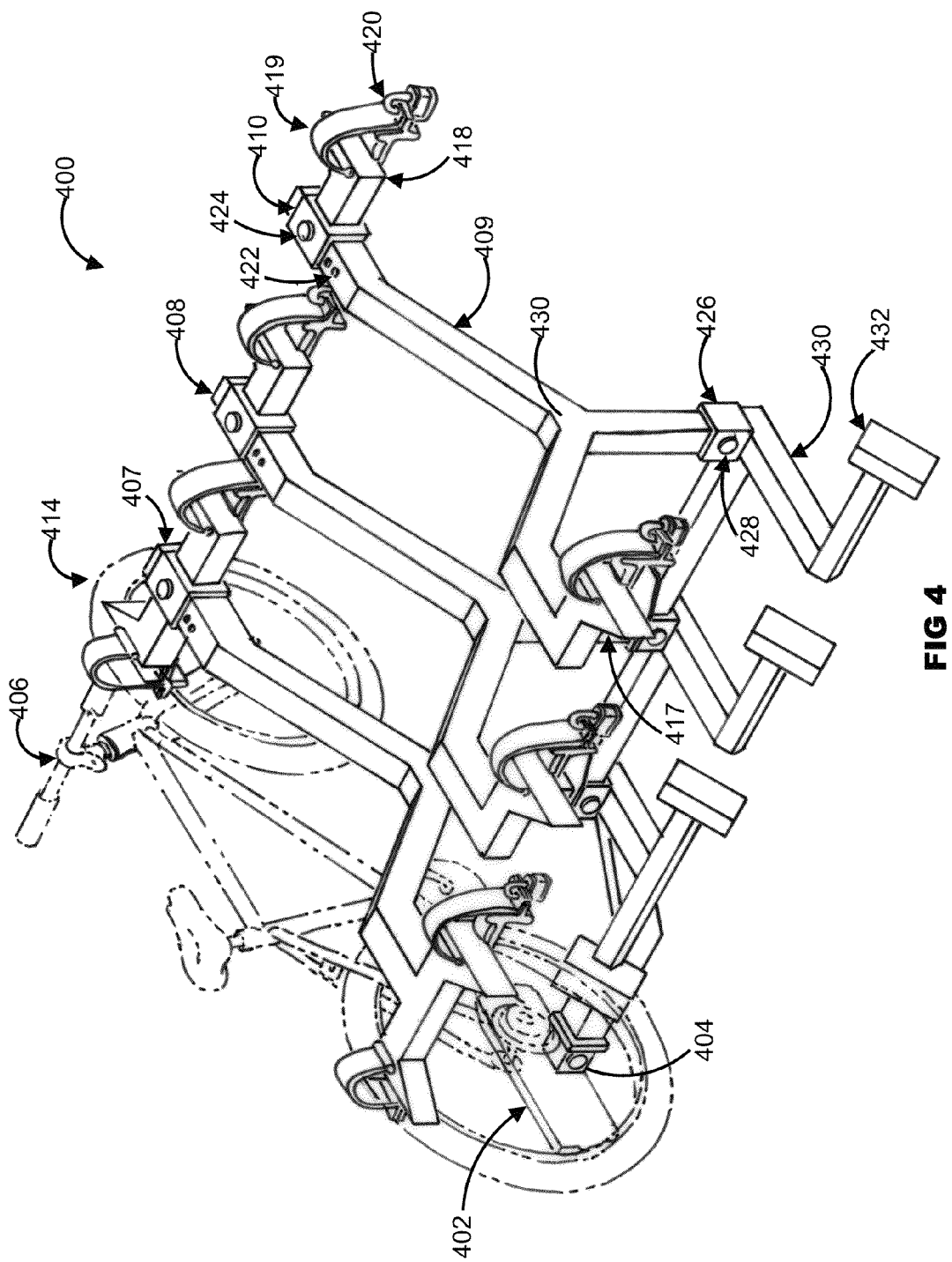
FIG. 4 shows a perspective view illustrating a bicycle transporting system that may be expanded to carry four or more bicycles.

FIG. 4 shows a perspective view illustrating bicycle transporting system 400 that may be expanded to carry four or more bicycles. FIG. 4 shows a perspective, exploded view illustrating a series of interlocking Y-shaped racks to transport four or more bicycles, all hung and braced by and along their tires, where rack 407 is mounted to receiver hitch 404 of vehicle 402 (only the bumper is shown), rack 408 is mounted to rack 407, and rack 409 is mounted to rack 408. Additional racks may be added considering the type of mount (e.g. receiver hitch, bumper-mating, spare-tire-mating, etc.) and other factors such as, for example, the maximum amount of weight that may be supported by the mount or the vehicle. Bicycle 406 may be transported on each of the racks 407, 408, and 409, as shown. Wheels 413 of bicycle 406 may be hung by and braced by fixed hook-and-brace 417 and movable hookand-brace 418, as shown. Hinged fastener 419 may prevent wheels 413 from being dislodged during transport. Lock 420 may prevent hinged fastener 419 from being opened except by the owner of the vehicle or bicycle to assist preventing theft or unauthorized use of the bicycle.

Movable-hook-and-brace 418 attaches to frames 407, 408, and 409 by sliding sleeve 410 over and along the length of frame and lining up bolt 420 with one of the series of holes 422, as shown. Movable-hook-and-brace 418 secures to the frame by bolt 424 through one of series of holes 422. Bolt 424 may be secured by fastening a nut on the underside. Bolt 424 may be secured or locked by other mean, such as, for example, a cotter pin, a lock, or other removeable fastener. System 400 may include one, two, or more wheel-braces (for each bicycle), connected to the support or frame, to brace the front wheel or the rear wheel to limit the rotation of the stem and headset. System 400 may include a frame or support having a formed, single metallic tube and the wheel-braces may be formed, metallic tube integral to the support. System 400 may include a frame or support having a formed, single metallic wheel braces with a mated sleeve (or other moveable attachment as described elsewhere) to attached to support, as shown.

System 400 may include Y-shape 430 which may be positioned to prevent obstruction with a portion of the bicycle while the bicycle is hanging from and braced by its hooks-and-braces. Alternately, the position of the hooks and braces may be adjusted so that no portion of the frame or support obstructs a portion of a bicycle while the bicycle is hanging from and braced by its hooks-and-braces.

Upright-receiver (or bracket) 426 may include a steel sleeve permanently fixed in place around a portion of frame 407, 408, or 409, as shown. Lock 428 may extend through an aperture in upright-receiver 426, as shown. Upright-receiver 426 may mate with a portion of another frame to add additional frames and increase the capacity to carry additional bicycles. (See also FIGS. 12A, 12B, 12C, and 12D). Fixed sway-limiter 430 may connect to frame 407, 408 or 409, as shown. Fixed sway limiter 430 may include channel 432 which may be positioned to hold the bottom portion of wheels 413, as shown. System 400 includes a series of interlocking racks that adjoin to support additional bicycles.

Figure 5:
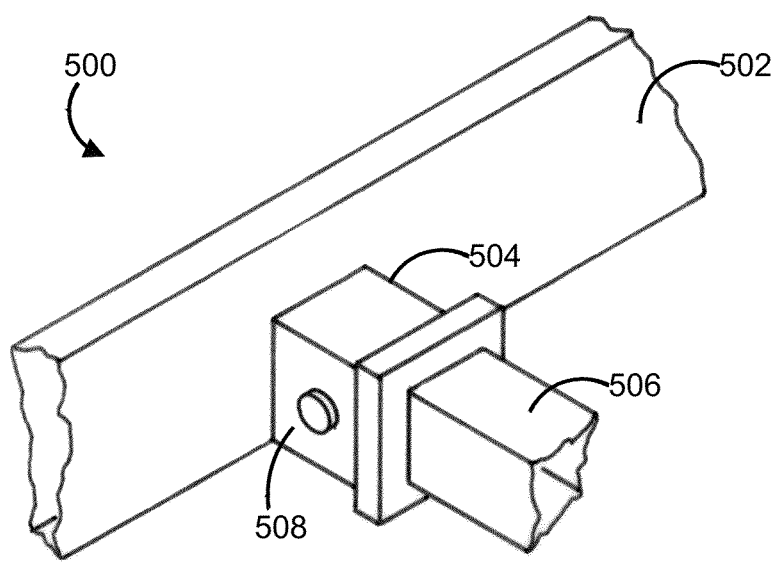
FIG. 5 shows a perspective view illustrating a mounting member for mounting a rack to a receiving hitch.

FIG. 5 shows a perspective view illustrating a mounting member for mounting and mating a rack to a receiving hitch. System 500 includes vehicle 502 having receiving hitch 504 adapted to receive a portion of frame 506. Frame 506 includes an aperture to accept bolt 508, as shown. Frame 506 includes the mate that is received by receiving hitch 504 vehicle 502.

Figure 6:
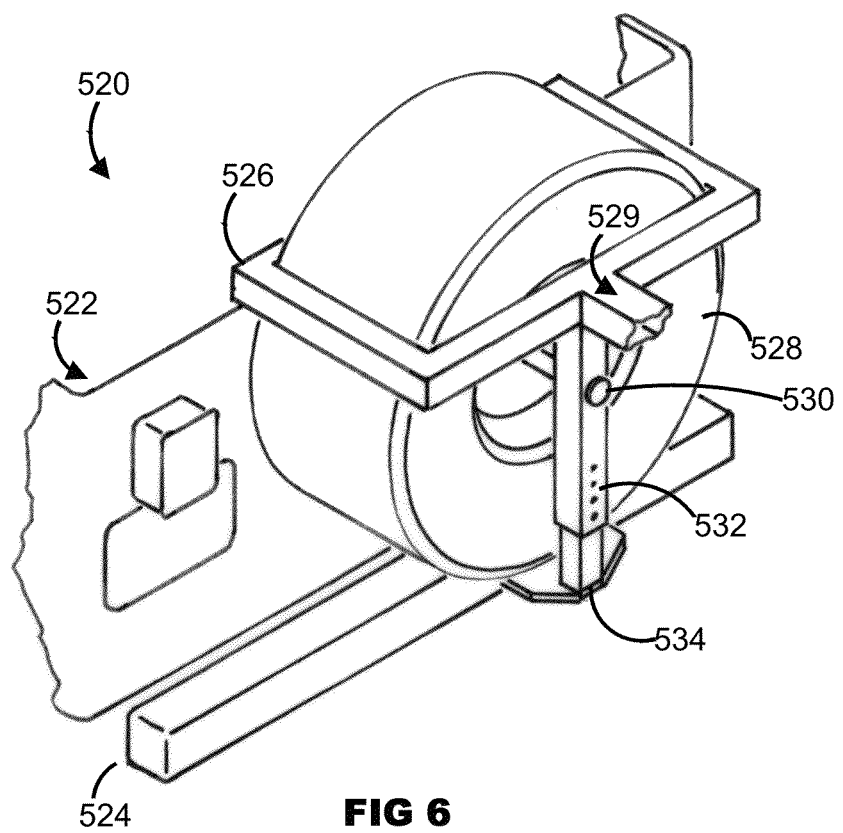
FIG. 6 shows a perspective view illustrating a mounting member for mounting a rack to the spare wheel of a vehicle.

FIG. 6 shows a perspective view illustrating a mounting member for mounting and mating a rack to the spare wheel of a vehicle. System 520 includes vehicle 522 and bumper 524, as shown. Vehicle 522 may also include spare tire 528, as shown. Spare-tire-mating mount 529 may attach to vehicle 522, as shown. Spare-tire-mating mount 529 may include rectangular bracket 528. Spare-tire-mating mount 529 may include a rectangular bracket 526 sized to fit over a portion of spare tire 528, as shown. Spare-tire-mating mount 529 may include mounting-bolt 530 to attach spare-tire-mating mount 529 to vehicle 522 coextensively with the axle connector for spare tire 528, as shown. Spare-tire-mating mount 529 may include adjustable bottom brace 534 to clamp adjustably to the bottom of spare tire 528, as shown. This configuration, and subsets, may allow removably attaching a rack to vehicle 522 using a bracket to mount upon spare tire 528, as shown.

FIG. 7 shows a perspective view illustrating a mounting member for mounting and mating a rack to a vehicle bumper. System 540 includes vehicle bumper 542 and a portion of rack 552, as shown. Rack 552 may be connected to bumper-mating plate 543, as shown. Bumper-mating plate 543 may have a shape similar to a portion of bumper 542 so that vehicle bumper 524 may support along the length of bumper-mating plate 543, as shown. Bumper-mating plate 543 may be disposed adjacent to bumper 542 as shown. Protective pad 550 may be placed between bumper mating plate 543 and bumper 542 to protect bumper 542 from scratches or other damage that may otherwise be caused. Alternatively, protective pad 550 may be affixed to bumper-mating plate 543. Alternately bumper mating plate 543 may include a protective coating to prevent damage to bumper 542. Straps 544 may be connected to bumper plate 548 and bumper 542 to removably hold bumper-mating plate 543 (and thereby rack 552) in position on vehicle bumper 542, as shown. Straps 544 may have fasteners 548 to fasten together bumper 542 and bumper-mating plate 543, as shown. Straps 544 may include ratchet 546 to tighten straps 544 so that fasteners 548 may hold bumper mating plate 543 while the vehicle may be traveling, as shown. Rack 552 includes a bracket and straps to mount along the bumper of a vehicle, as shown. System 540 (i.e. bumper mounting racks) may also include a frame capable of being dismantled to prevent holding a heavy frame while simultaneously fastening straps. (See also FIG. 10B for an example of a frame capable of being dismantled).

Figure 8A:
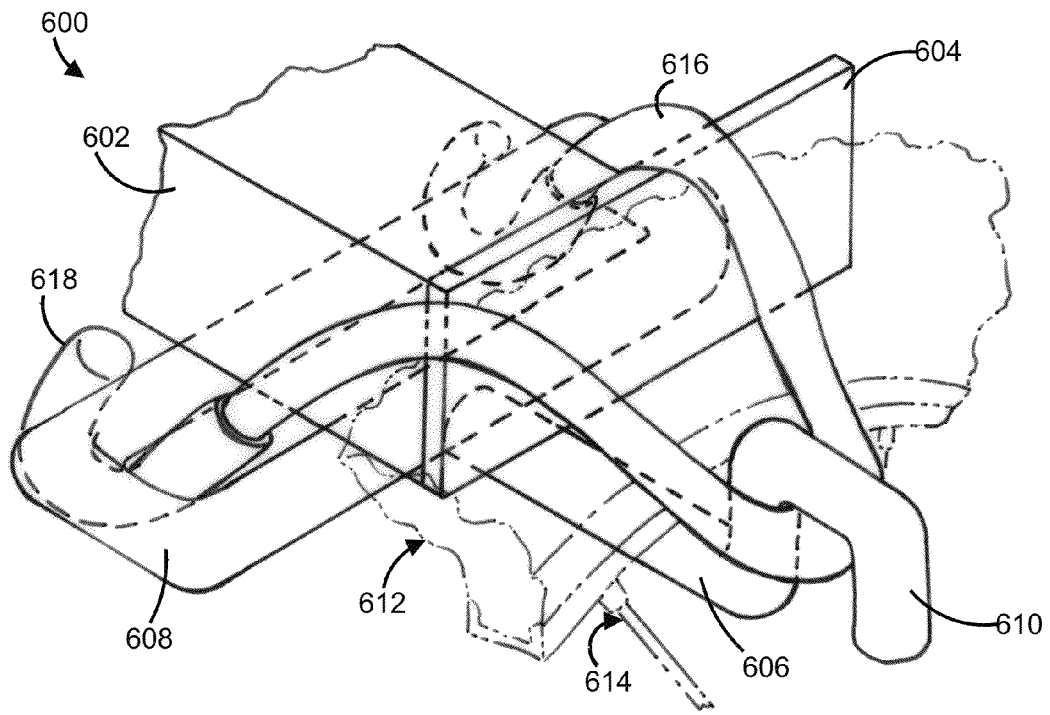
FIG. 8A shows a perspective view illustrating a hook and brace for suspending and bracing the wheel of a bicycle on a rack for transporting bicycles.

FIG. 8A shows a perspective view illustrating a hook and brace for suspending and bracing the wheel of a bicycle on a rack for transporting bicycles. System 600 may include frame 602, which holds wheel 612 by suspending wheel 612 from hook 606 and bracing wheel 612 by brace 604, as shown. Frame 602 may include brace 604, as shown. Brace 604 is shown as welded to frame 602, alternately, brace 604 may be integral to frame 602. Brace 604 extends along a portion of wheels 612 to prevent rotation of the headset and stem of the bicycle. Hook 606 is shown as welded to frame 602, as shown. Alternately, hook 606 may also be formed integral to frame 602. Hook 606 may be disposed such that wheel 612 may be positioned over hook 606 so that wheel 612 may be suspend from hook 606, as shown. Hook 606 may be sized to position between spokes 614, as shown.

Wheel 612 may be held firmly in position using strap 616, as shown. Strap 616 may stretch from strap loop 608, over wheel 612, under strap holders 610, over wheel 612, to attach to the other end of strap loop 608, as shown. Strap-hooks 618 may attach strap 616 to strap loop 608, as shown. Strap 616 may be an elastic cord such as, for example a bungee cord. Alternately, straps 616 may be another type of fastener. (See also FIGS. 9A, 9B, and 9C.) In this embodiment, this wheel-suspender-brace includes a hook.

Figure 8B:
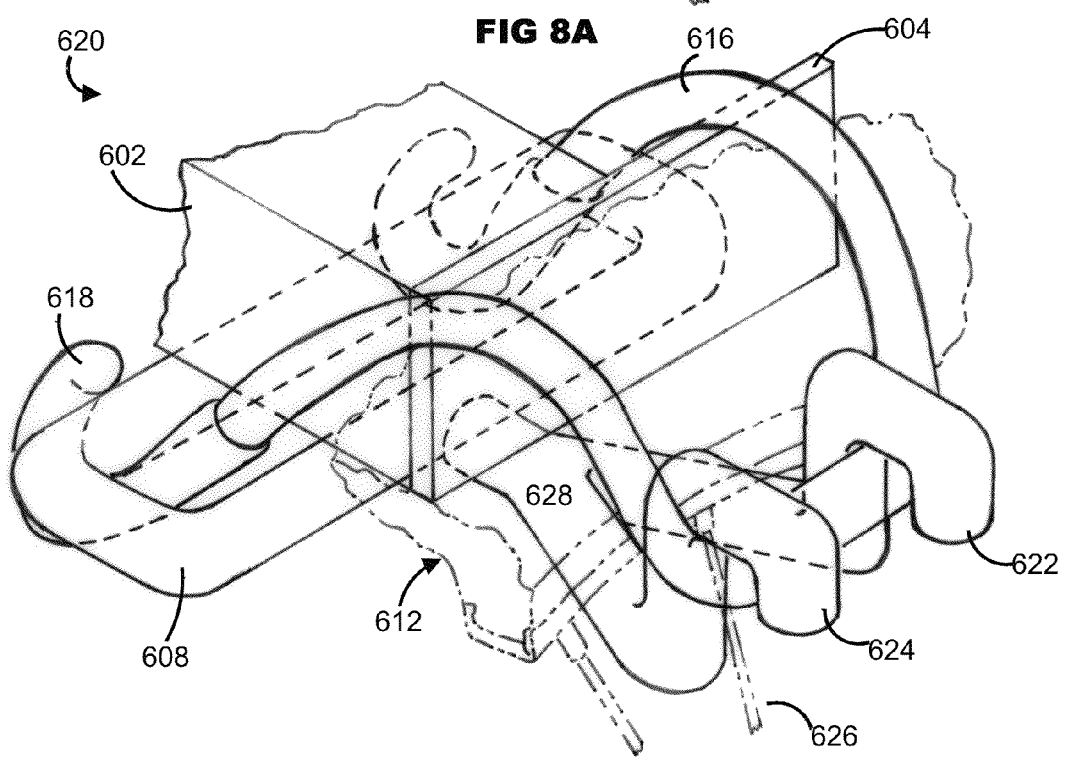
FIG. 8B shows a perspective view illustrating a Y shaped hook that extends to either side of a spoke of a wheel of a bicycle according to another embodiment of the present invention.

FIG. 8B shows a perspective view illustrating a Y-shaped hook that extends to either side of a spoke of a wheel of a bicycle according to another embodiment of the present invention. System 620 may include a Y-shaped hook 628, as shown. Y-shaped hook 628 may be formed and positioned so that spokes 628 may fit on either side with one spoke within the Y, as shown. Straps 618 may stretch from strap loop 608, over wheel 612, under strap holder 622, under strap holder 624, over wheel 612, to attach to the other end of strap loop 608, as shown. Strap-hooks 618 may attach strap 616 to strap loop 608, as shown. In this embodiment, the faster includes an elastic cord, Alternately, other types of fasteners may be used. (See also FIGS. 9A, 9B, and 9C.)

Figure 9A:
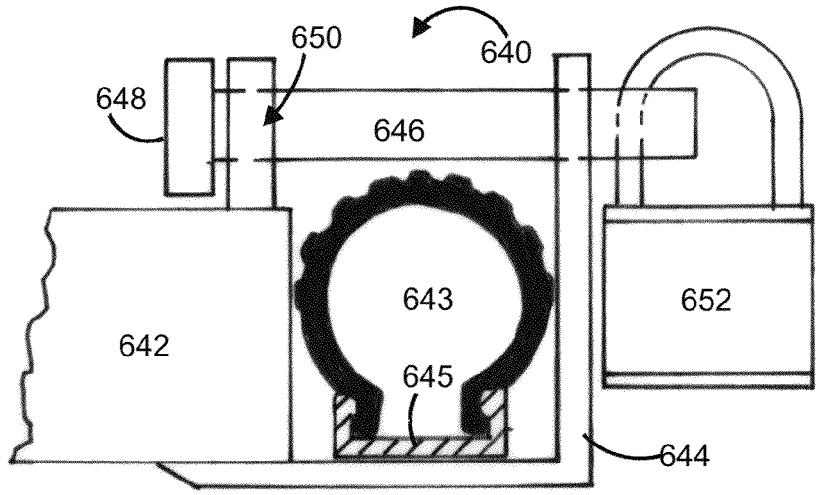
FIG. 9A to 9C show cross-sectional views illustrating three kinds of hooks and fasteners for suspending wheels of bicycle on a rack according to an embodiment of the present invention.
Figure 9B:
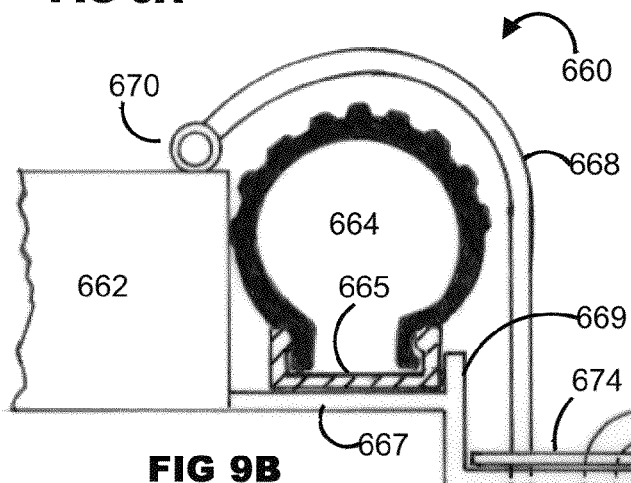
Figure 9C:
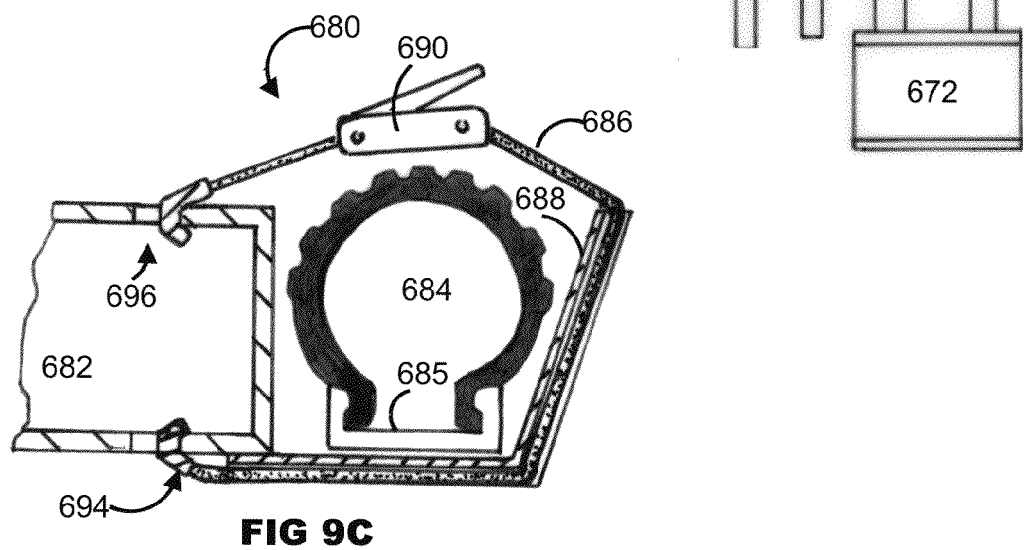

FIG. 9A to 9C show cross-sectional views illustrating three kinds of hooks and fasteners for suspending wheels of bicycle on a rack according to an embodiment of the present invention.

FIG. 9A shows a cross-section of U-shaped channel 640 which may be closed using bolt 646 and locked with the lock 652, as shown. Frame 642 and hook 644 join together to form U-shaped channel 640, as shown. Bolt 646 extends through apertures 652 to enclose the top of wheel 643, as shown. Rim 645 may rest upon hook 644 to suspend a bicycle, as shown. Bolt 646 may be held in place by bolt-head 648 which may be larger than apertures 650 to prevent bolt 646 from becoming dislodged from apertures 650, as shown. Bolt 646 may be any type of fastening member capable of joining, holding, or closing an opening, such as, for example, a pin, bolt, screw, rivet, etc. Lock 652 may pass through a portion of bolt 646 to prevent bolt 646 from being removed without first removing lock 652, as shown. This configuration may provide for a durable and strong method and apparatus for suspending bicycle wheels attached to frame 642.

FIG. 9B shows a cross-section of hinged hook 660 for enclosing wheel 646 with a lower lift height for wheel 646 than the embodiment shown in FIG. 9A. Frame 662 and hook 667 May form part of the enclosure to suspend wheel 664, as shown. Rim 665 may rest upon hook 667 to allow the bicycle to be suspended from frame 662, as shown. Clasp 668 connects with frame 662 by hinge 670, as shown. Hinge 670 allows clasp 668 to connect with a portion of hook 667 to allow wheels 664 to be completely enclosed by frame 662, hook 667, and clasp 668, as shown. When hinge 670 and clasp 668 are in the closed position lock 672 may pass through a portion of hook 667 and locking plate 674, as shown. When locked, this embodiment may prevent the bicycle from being removed from frame 662, as shown. Ridge 669 may assist holding that wheel 664 in place while closing and locking clasp 668, as shown. In alternate embodiments, hook 667 may be formed without ridge 669. In some embodiments, clasp 668 may include a portion of wheel 664 to firmly hold wheel 664 in place upon hinged hook 660, as shown.

Figure 9D:
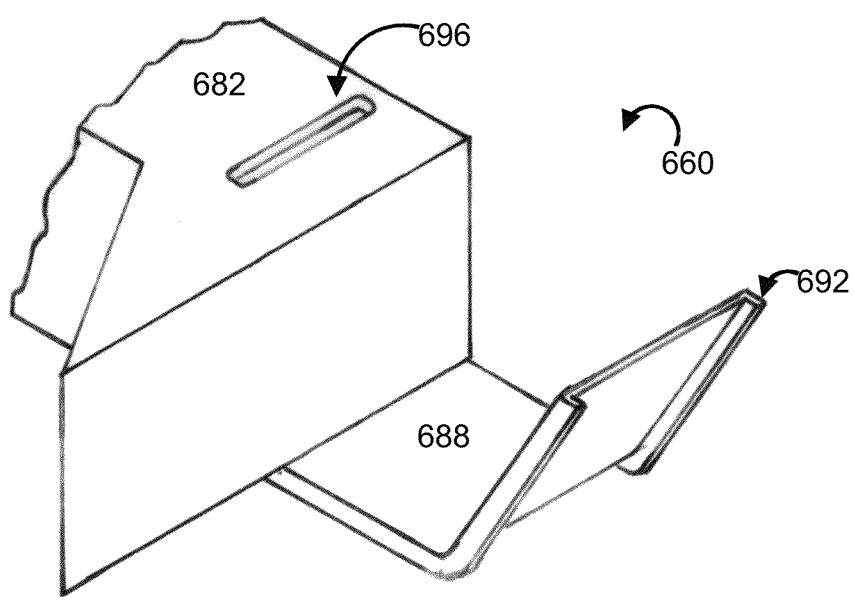
FIG. 9D shows a perspective view illustrating a channel and brace for suspending and bracing a wheel according to the embodiment of FIG. 9C.

FIG. 9C (cross-sectional view) and FIG. 9D (perspective view) show shallow V-shaped channel 680 which may be enclosed by ratcheting strap 686, as shown. FIG. 9D shows a perspective view illustrating a channel and brace for suspending and bracing a wheel according to the embodiment of FIG. 9C, as shown. Referring to FIGS. 9C and 9D, frame 682 and hook 688 form a portion of the enclosure for wheel 684, as shown. Rim 685 may rest upon hook 688 to suspend the bicycle on frame 682, as shown. Ratcheting strap 686 may wrap around hook 688 in the top portion of wheel 684, as shown. Ratcheting strap 686 may be held in place by strap-hooks 694 which may be disposed within hook-holes 696, as shown. In some embodiments, ratcheting strap 686 may be further held in place by guides 692 along the edge of hook 688 to prevent ratcheting strap 686 from slipping laterally. Ratchet 690 may be tightened to firmly hold wheel 684 in place within shallow V-shaped channel 680, as shown. In some embodiments, wheel 684 may extend above the top edge of hook 688 or frame 682 to allow ratcheting strap 686 to compress wheel 684 whenever ratcheting strap 690 is positioned and ratcheted to firmly secure wheel 684, as shown. This embodiment may have the advantage of reducing damaging vibration transmitted to the bicycle during transport.

FIG. 9A, FIG. 9B, FIG. 9C, FIG. 9D, FIG. 8A, and FIG. 8B show front and rear wheel-suspenders that include hooks (to suspend the wheels) and fasteners (to removably fasten the wheel to the wheel-suspender. FIG. 9C shows a fastener that includes a ratcheting strap. FIG. 9B shows a formed member, hingedly connected to the wheel-suspender, to encircle a portion of the wheel not encircled by the wheel-suspender. These FIGs also show fasteners to removably fasten the wheel to the wheel-suspender by encircling the portion of the wheel not encircled by the wheel-suspender. Hooks may include U-shaped, V-shaped, L-shaped, open channels, double hooks, forks, etc. Fasteners may include elastic cords, ratcheting straps, hinged clasps, locking bolts, etc.

Figure 10A:
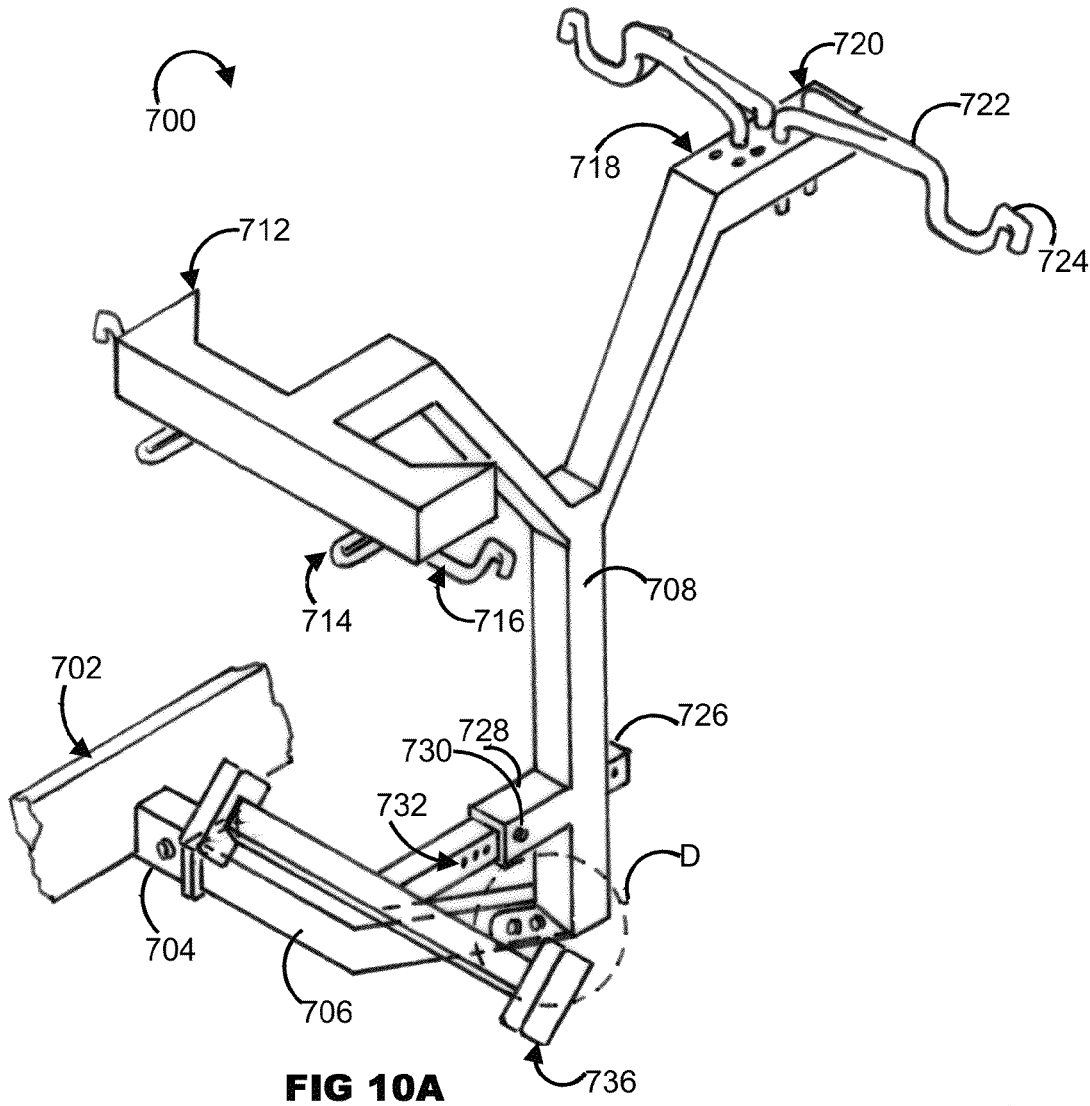
FIG. 10A shows a perspective view illustrating a bicycle transporting system that may independently adjust for different wheel spans for each bicycle and that may be disassembled for storage.

FIG. 10A shows a perspective view illustrating bicycle transporting system 700 that may independently adjust for different wheel spans for each bicycle and that may be disassembled for storage. Bicycle transportation system 700 includes structures and features that allow the adjustment of the wheel span for different size bicycles. Bicycle transportation system 700 includes structures and features to allow disassembly of a portion of frame 706 to allow more compact storage. Bicycle transportation system 700 attaches to vehicle bumper 702 by inserting mounting-member 706 into receiving hitch 704, as shown. Mounting member 706 may be formed to mate with receiving hitch 704, as shown. Y-shaped frame 708 may couple with mounting-member 706 as shown in detail area 710, which may be seen in FIG. 10B.

Figure 10B:
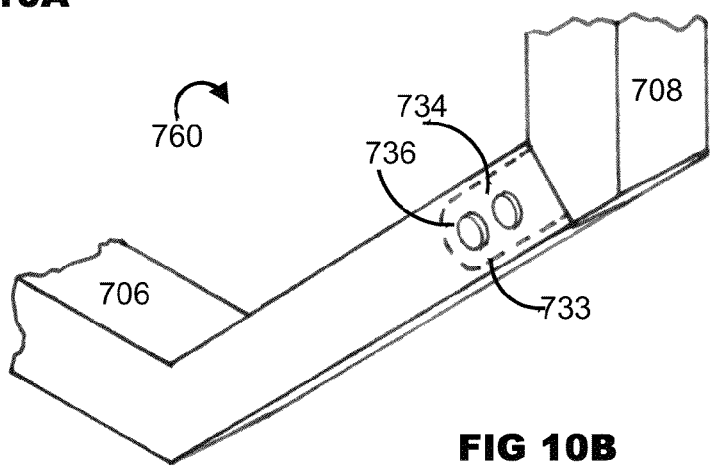
FIG. 10B shows a detail view illustrating the portion of the rack that may be disassembled for storage according to the embodiment of FIG. 10A.

FIG. 10B shows a detail view illustrating the portion of the rack that may be disassembled for storage according to the embodiment of FIG. 10A. Mounting-member 706 connects to Y-shaped frame 708 by mating frame-connector 733 of Y-shaped frame 708 into mounting-member 706, as shown. Bolt 736 and bolt 734 may be inserted through holes in mounting-member 706 and frame-connector 733 and held in place, such as, for example, by a cotter pin, lock or other fastener.

Figure 11:
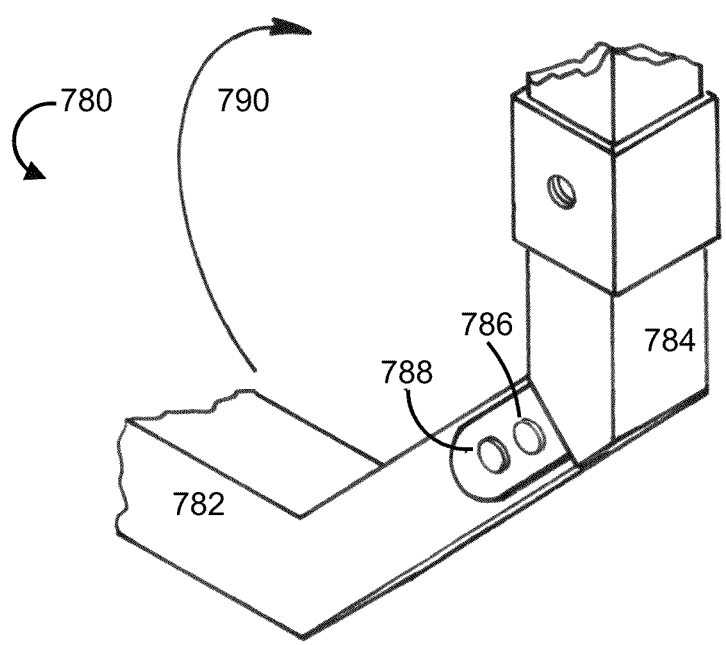
FIG. 11 shows a perspective view illustrating a portion of a rack that allows folding the rack for storage.

FIG. 11 shows a perspective view illustrating a portion of a rack that allows folding the rack for storage. Mounting-member 782 may be connected to frame 784 by hinge 788, as shown. When in the unfolded position (operating position for holding and transporting bicycles), the frame may be held steady by locking-bolt 786 which may fit through an aperture in frame 784 and mounting-member 782 thereby preventing movement of hinge 788, as shown. Locking-bolt 786 may be held in place by a cotter pin, lock or other fastener. Hinge 788 may allow folding as indicated by line 790.

Referring again to FIG. 10A, Y-shaped frame 708 may include fixed-position braces 712, strap-hooks 714, and wheel-suspenders 716, as shown. Y-shaped frame 708 may include series of holes 718, and movable hook 722, as shown. Movable hook 722 may include pins 720 which may mate with at least two nearby holes in the series of holes 718, as shown. Movable hook 722 may include groove 724 to allow an elastic strap to be placed over the top of the wheel suspended within hook 722 in order to enclose the wheel and prevent the wheel from becoming dislodged during transportation.

In an alternate embodiment, movable hooks and a series of holes may be positioned at both ends of a bicycle frame; one or more of the hooks for each bicycle may be a fork type similar to FIG. 8B. Alternately, two or more of the movable hooks may be used. Use of multiple of forked hooks may provide bracing to a least one wheel. In a further embodiment, removable, slideable hooks (for example, see 407 on FIG. 4) may be disposed on either end of the frame.

Sway-limiter 726 may be inserted into Y-shaped frame 708 by positioning sway-limiter 726 within brackets 728, as shown. Sway-limiter 726 may be adjustably positioned to hold the bottom of the wheel by positioning one of the series of holes 732 so that bolt 730 may be inserted through the hole and held in place, such as, for example by a cotter pin, lock or other fastener. Sway-limiter 726 may prevent the bicycle from swaying along the axis form by hook 716 and hook 722, as shown. In all of these embodiments, portions of the frame may disassemble for storage, such as, for example, the mounting-member 706 may be uncoupled from Y-shaped frame 708, movable hooks 722 may be removed from Y-shaped frame 708, sway-limiter 726 may be removed from Y-shaped frame 708, etc.

Bicycle transportation system 700 allows various adjustments to fit the rack to the wheel span or wheel size of the bicycle, such as, for example sliding top-mounted design (for example, see 407 on FIG. 4), a series of holes and pins with a double hook to allow dependent adjustment the wheel span on each side of the rack, a sliding sway-limiter for holding each wheel, a pivoting sway-limiter for holding the bottom of a wheel. Bicycle transportation system 700 may include other structures of other embodiments shown herein, such as, for example, a single bike rack using a T-shaped frame, a double bike rack using a T-shaped frame, a double bike rack using a Y-shaped frame, a folding rack (see FIG. 11), a multi-piece disassembleable-rack, etc. These systems may include adjustability of the wheel span using a slide, or a set of pins attached to movable hook which may be disposed within a series of holes along a portion of the frame. These systems may include wheel-suspender-braces connected to the frame or support. These systems may include wheel-suspender-braces that are not integral to the frame or support, such as, for example when using multiple moveable-hooks or a hook that supports the wheel across a space that spans more than the distance between the bicycle spokes (see hook 628 of FIG. 8B).

Figure 12A:
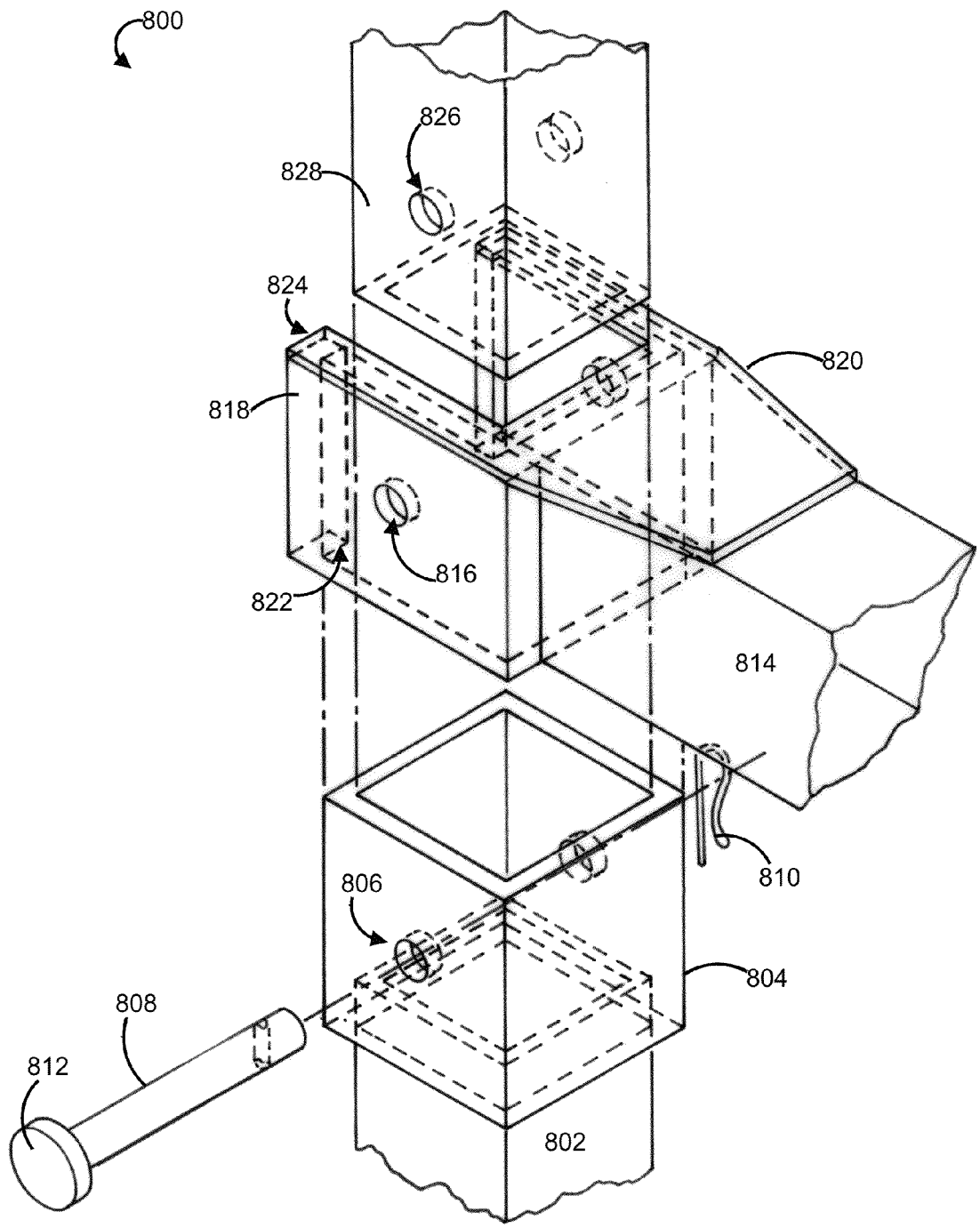
FIG. 12A shows an exploded, perspective view illustrating a system for hitching together frames to allow expanding the rack to carry additional bicycles.
Figure 12B:
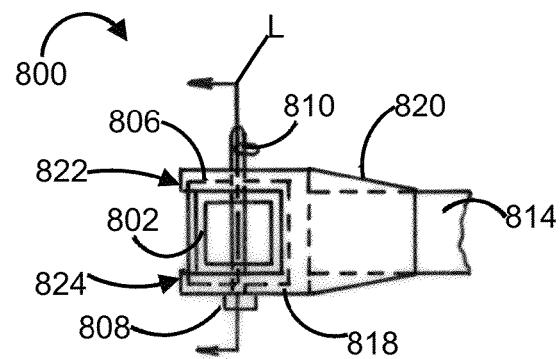
FIG. 12B shows a top view illustrating a system for hitching together frames to allow expanding the rack to carry additional bicycles according to the embodiment of FIG. 12A.
Figure 12C:
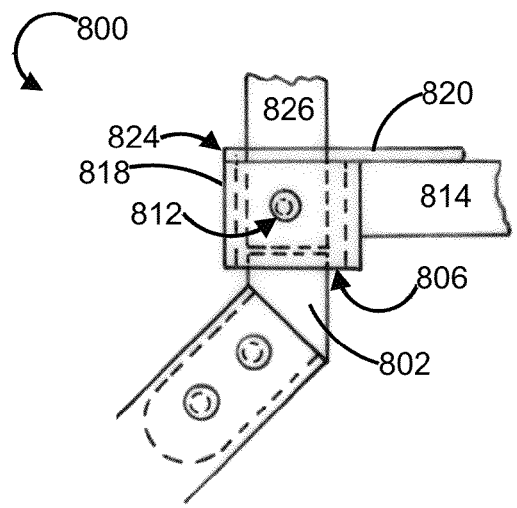
FIG. 12C shows a side view illustrating a system for hitching together frames to allow expanding the rack to carry additional bicycles according to the embodiment of FIG. 12A.
Figure 12D:
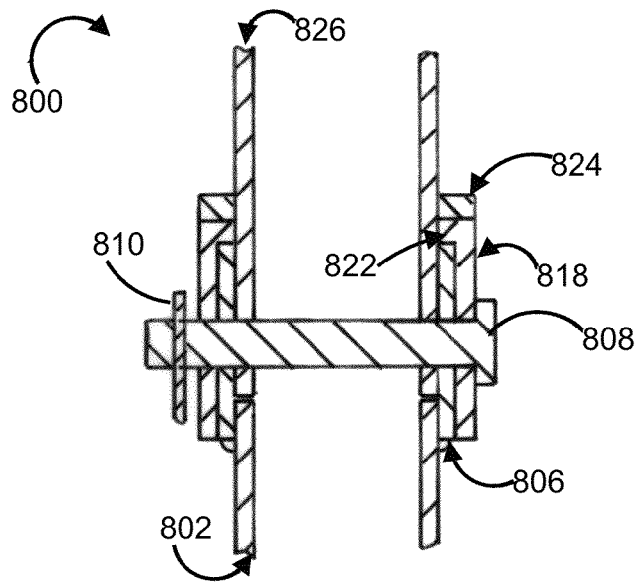
FIG. 12 D shows a cross sectional view illustrating system for hitching together frames to allow expanding the rack to carry additional bicycles through the line L of FIG. 12B

FIG. 12A to D show a system for hitching frames together in order to expand the rack to carry additional bicycles. FIG. 12A shows an exploded, perspective view illustrating a portion of a rack that allows for expanding the rack to carry additional bicycles. FIG. 12B shows a top view of the portion of a rack that allows for expanding the rack to carry additional bicycles according to the embodiment of FIG. 12A. FIG. 12C shows a side view of the portion of a rack that allows for expanding the rack to carry additional bicycles according to the embodiment of FIG. 12A. FIG. 12D shows a cross sectional view illustrating the portion of a rack that allows for expanding the rack through the line L of FIG. 12B. (For an overview of bicycle racks extended by hitching frames together see FIG. 4)

Considering FIG. 12A to D together, hitching system 800 includes upright-mount 802 that is fixedly connected to upright-receiver 804, as shown. Upright-support 828 may have the same size and shape periphery as upright-mount 802, as shown. Upright-support 828 may insert into upright-receiver 804, as shown. Upright-support 828 may rest upon upright-mount 804 when upright-support 828 is inserted into upright-receiver 804, as shown.

Perpendicular-support 814 may be fixedly attached to coupling 818, as shown. Bracket 820 may be fixedly attached to perpendicular-support 814 and coupling 818, as shown. Perpendicular-ridges 824 may be integral with bracket 820, as shown. In alternate embodiments, perpendicular ridges 824 may be used without bracket 820. Upright-ridges 822 may be disposed along the open end of coupling 818, as shown. Coupling 818 may be sized to mate with upright-receiver 804 being sized just larger than the periphery of upright-receiver 804. Coupling 818 may rest upon upright-receiver 804 by resting on upright-receiver 804 with the load also placed on upright-ridges 822 and perpendicular-ridges 824, as shown. Ridges may be any type of restraining face or restraining member that may resist pressure in the direction perpendicular to its face.

Upright-receiver 804 may have set of apertures 806, as shown. Perpendicular support 814 may have set of apertures 816, as shown. Upright-support 828 may have set of apertures 826, as shown. Set of apertures 806. set of apertures 816, and set of apertures 826 may be positioned such that a locking-bolt 808 may be inserted through all six holes simultaneously when hitching system 800 is in the assembled position, so that hitching system 800 may be locked so that it will not come apart, such as, for example, during travel of a vehicle. Locking-bolt 808 may have bolt-head 814 and cotter pin 810 which may removeably hold locking-bolt 808 in place.

Hitching system 800 allows each portion of the system to be assembled while being held in place by gravity. For example, starting from the unassembled state, upright-support 828 may be placed within upright-receiver 804 and rest upon upright-mount 802 using gravity. After positioning upright-support 828, no manual or dexterous assistance is needed from the person hitching the frames together. Next, coupling 818 of perpendicular-support 814 may pass by upright-support 828 and over upright-receiver 804 before dropping down upon upright-receiver 804, as shown. Coupling 818 may be held in place by interlocking forces along upright-ridges 822 and perpendicular-ridges 824, as shown. Again, perpendicular-support 814 may be held in place using gravity and without manual assistance. Alternately, perpendicular-support 814 may be positioned before upright-support 828, thereby allowing the assembler to assemble whatever piece is the most convenient or handy. Finally, locking bolt 808 may be inserted through the sets of apertures 806, 816, 826, as shown. Hitching system 800 may allow for one handed assembly, which may require less dexterity on the part of the person assembling.

In an alternate embodiment, perpendicular support 814 may be required to be placed prior to upright-mount 802, which may allow coupling 818 to completely encircle upright-receiver 804, and thereby eliminate upright-ridges 822.

Although Applicant has described Applicant's preferred embodiments of this invention, it will be understood that the broadest scope of this invention includes modifications and implementations apparent to those skilled in the art after reading the above specification and the below claims. Such scope is limited only by the below claims as read in connection with the above specification. Further, many other advantages of Applicant's invention will be apparent to those skilled in the art from the above descriptions and the below claims.

What is claimed is:

1. A system to transport at least one bicycle on a vehicle, where the bicycle has two wheels, a front wheel and a rear wheel, each wheel having at least one passage between the wheel's tire and the wheel's axle, connected to a bike frame with at least one hinge to allow steering between the front wheel and the rear wheel, the system comprising:
   at least one support;
   wherein the at least one support comprises at least one pair of arms separated by a span sufficient to allow suspension of the bicycle while the front wheel and rear wheel remain operably attached to the bicycle;
   at least one wheel-suspender at the distal end of each arm to support the wheels by passing through the passage between the tires and the wheels' axle to allow the wheel to hang on the wheel-suspender;
   wherein the distal end of the arms widens to abut the wheels to brace the wheels to limit the rotation of the stem and headset; and
   at least one mount to mount the support to the vehicle.

2. The system of claim 1 wherein:
   the front wheel-suspender comprises a hook; and
   the rear wheel-suspender comprises a hook.

3. The system of claim 1 wherein:
   the front wheel-suspender comprises an open channel; and
   the rear wheel-suspender comprises an open channel.

4. The system of claim 1 wherein:
   the mount comprises a mate to a vehicle receiving-hitch.

5. The system of claim 1 wherein:
   the mount comprises a bracket to mount upon a spare tire.

6. The system of claim 1 wherein:
   the mount comprises a bracket and straps to mount along the bumper of the vehicle.

7. The system of claim 1 further comprising:
   an adjuster to adjust the distance between the front wheel suspender and the rear wheel-suspender to accommodate the wheel span of a bicycle.

8. The system of claim 1 further comprising:
   a clasp to hold firmly the wheels against the widened portion of the arms.

9. The system of claim 8 wherein:
   the support comprises formed, single, integral frame; and
   the pair of arms is formed integral to the support.

10. The system of claim 1 wherein:
    the widened portion of the arms comprise a plane flush with the side of the wheel and extending inwardly toward and outwardly from the center of the support.

11. The system of claim 10 further comprising:
a clasp to hold firmly the wheels against the widened portion of the arms and the flush plane.

12. The system of claim 1 further comprising:
at least one sway-limiter, connected to the support, to limit the sway of the bicycle around the axis formed between the front wheel-suspender and the rear wheel-suspender.

13. The system of claim 12 wherein:
the sway-limiter comprises a channel.

14. The system of claim 12 further comprising:
wherein the sway-limiter comprises an adjuster to adjust the distance of the channel to accommodate different size wheels or bicycles.

15. The system of claim 1 further comprising:
at least one fastener to fasten removably the wheel to the wheel-suspender.

16. The system of claim 15 wherein:
the fastener comprises elastic cord with hooks at each end.

17. The system of claim 15 wherein:
the fastener comprises a ratcheting strap.

18. The system of claim 15 wherein:
the fastener comprises a formed member, hingedly connected to the wheel-suspender, to encircle the portion of the wheel not encircled by the wheel-suspender.

19. The system of claim 1 further comprising:
at least two supports, and
at least one pairs of arms connected to each support,
wherein the two supports adjoin by at least one bracket.

20. A system to transport at least one bicycle on a vehicle, where the bicycle has two wheels, a front wheel and a rear wheel, each wheel having with spokes and rims, affixed to a bike frame with stem and headset to allow steering between the wheels, the system comprising:
at least one front wheel-suspender to suspend the front wheel by passing the front wheel-suspender through the spokes to allow the rim to hang on the front wheel-suspender;
at least one rear wheel-suspender to suspend the rear wheel by passing the rear wheel-suspender through the spokes to allow the rim to hang on the rear wheel-suspender;
at least one support comprising at least one pair of arms separated by a span sufficient to allow suspension of the bicycle while the front wheel and rear wheel remain operably attached to the bicycle, wherein the front wheel-suspender and the rear wheel-suspender are disposed at the distal ends of the arms; and
wherein at least one of the arms widens at the distal end to brace one of the wheels to limit the rotation of the stem and headset;
at least one mount to mount the support to the vehicle.

21. The system of claim 20 further comprising:
at least one a clasp to hold firmly the wheels against the widened portion of the arms.

22. The system of claim 20 further comprising:
at least one sway-limiter to limit the sway of the bicycle around the axis formed between the front wheel-suspender and the rear wheel-suspender.

23. A system to transport at least one bicycle on a vehicle, where the bicycle has two wheels, a front wheel and a rear wheel, each wheel having at least one passage between the wheel's tire and the wheel's axle, affixed to a bike frame with at least one hinge to allow steering the front wheel, the system comprising:
front-wheel-suspending means for suspending the front wheel by passing the front-wheel-suspending means through the passage between the front wheel's tire and the wheel's axle to allow the front wheel to hang on the front-wheel-suspending means;
rear-wheel-suspending means for suspending the rear wheel by passing the rear-wheel-suspending means through the passage between the rear wheel's tire and the wheel's axle to allow the rear wheel to hang on the rear-wheel-suspending means;
supporting means for supporting a pair of arms with the front-wheel-suspending means disposed at the distal end of one arm and the rear wheel-suspending means disposed at the distal end of one arm, and wherein the pair of arms is separated by a span sufficient to allow suspension of the bicycle while the front wheel and rear wheel remain operably attached to the bicycle; and
rotation-limiting means-for limiting the rotation of the stem and headset by widening the portion of the arm that abuts the front wheel and the rear wheel;
sway-limiting means, connected to the support, to limit the sway of the bicycle around the axis formed between the front wheel-suspender and the rear wheel-suspender;
clasping means to firmly hold the wheels to the rotation-limiting means; and
mounting means for mounting the supporting means to the passenger vehicle;
front-wheel-suspending means for at partially encircling the front wheel and for suspending the front wheel by passing the front-wheel-suspending means through the passage between the front wheel's tire and the wheel's axle to allow the front wheel to hang from the encircling portion of the front-wheel-suspending, means;
rear-wheel-suspending means for at least partially encircling the rear wheel for suspending the rear wheel by passing the rear-wheel-suspending means through the passage between the rear wheel's tire and the wheel's axle to allow the rear wheel to hang from the encircling portion of the rear-wheel-suspending means;
supporting means for supporting the front-wheel-suspending means and the rear wheel-suspending means separated by a span sufficient to allow suspension of the bicycle while the front wheel and rear wheel remain operably attached to the bicycle; and
wheel-bracing means, adjacent to the wheel-suspending means, for bracing the front wheel and the rear wheel to limit the rotation of the stem and headset;
fastening means for removably fastening the wheels to the wheel-suspending means by encircling the portion of the wheel not encircled by the wheel-suspending means and holding the wheels against the wheel-bracing means to limit the rotation of the steam and headset;
sway-limiting means, connected to the support, to limit the sway of the bicycle around the axis formed between the front wheel-suspender and the rear wheel-suspender; and
mounting means for mounting the supporting means to the passenger vehicle.

* * * * *